Patented July 12, 1938

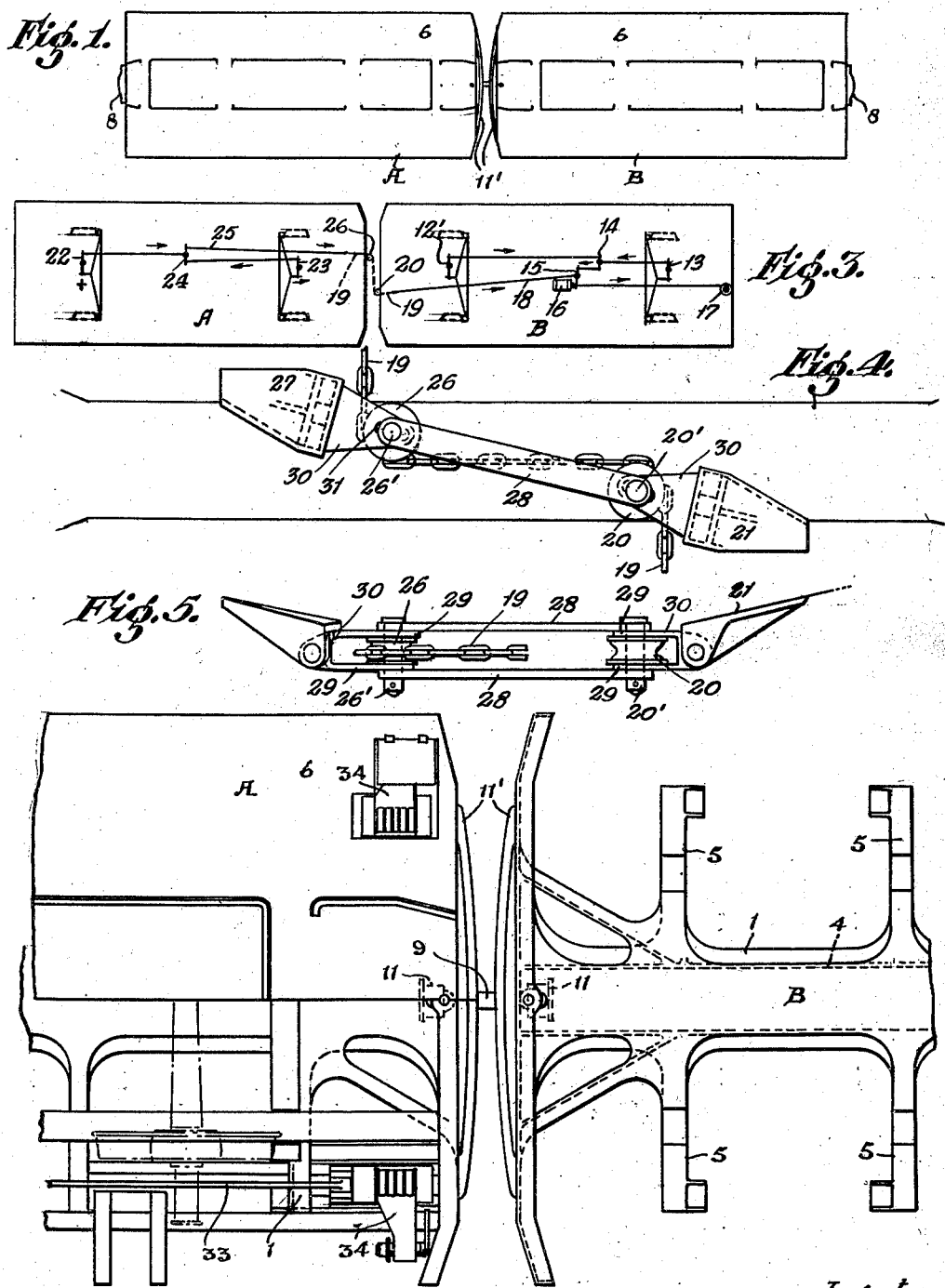

2,123,423

UNITED STATES PATENT OFFICE 2,123,423

BRAKE EQUIPMENT FOR ARTICULATED CARS

William Platts Kellett, Jr., New York, N. Y., assignor to William Platts Kellett, Bronxville, N. Y.

Application October 4, 1935, Serial No. 43,477

9 Claims. (Cl. 188—34)

The invention relates to articulated cars particularly applicable to the economical transportation of freight or goods in container lots and more particularly to improvements in brake applying equipment therefor.

The principal objects of the invention are to provide a simple but effective means operable from one of the car sections for uniformly applying the brakes on both car sections and to provide a brake-connecting means between the respective sections which will permit wide relative displacement of the car sections with the minimum effect on the braking equipment.

The principal feature consists in the provision of an articulated flexible brake equipment operable from one of a pair of car sections and having an operative connection between the respective sections which is guided in special relation to the longitudinal vertical centre plane of the car sections to effectively brake the wheels of both sections of the car under varying conditions of load and position.

In the accompanying drawing Figure 1 is a diagrammatic elevational view of an articulated car to which the present invention is applicable.

Figure 2 is a plan view of the coupled ends of the car sections, one section having the deck removed showing the bare frame.

Figure 3 is a diagrammatic plan view of the articulated car showing the preferred form of flexible brake equipment.

Figure 4 is an enlarged plan detail of the support for the flexible brake coupling arranged between the articulated car sections.

Figure 5 is an enlarged elevational detail of the structure illustrated in Figure 4.

The customary practice in American car building is to support a long and very heavy frame between transverse bolsters carried on massive trucks and as the lengths of cars have increased, these frames have become exceedingly cumbersome and many extremely expensive forms of car frame have been put into practice.

The advent of the removable goods container for the transportation of freight materially reduces the requirements for the "box car" and as such containers are being produced in half and quarter car lengths the requirements for the solid, full length car is abated. Cars of half length are in common use in Great Britain and Europe and these dispense with the use of the extremely heavy and expensive trucks.

It is not considered desirable practice to adopt the use of the individual short railway "wagon" as above referred to for many reasons but by coupling such cars with a permanent flexible coupling as shown but not claimed herein to thus provide a full length car having four, comparatively uniformly distributed wheel supports throughout its length, distinct advantages may be achieved.

In the structure herein illustrated a car comprises two sections A, B, each having a suitable frame 1 carrying suitable journal guides in which the axles of the wheels 3 are mounted equidistant from each end. The frame 1 as herein shown is preferably a unitary casting having a longitudinal box-like centre 4 with lateral arms 5 extending outwardly therefrom to support any desired form of superstructure carrying a deck 6, which will be provided with suitable guides and means for supporting the removable goods containers 7.

One end of each of such car sections A, B, is provided with any suitable form of draft rigging and the adjacent ends of said sections are permanently connected in an articulated manner by a draft rod 9 which may be suitably spring buffed.

It will be understood that a car constructed in two sections connected together as described will be adaptable to carry individual loads and such loads will, because of the arrangement of wheel supports, be uniformly supported and the articulated car will be free to flex vertically and horizontally intermediate of its length.

A suitable braking equipment is provided on each of the sections A, B, one of which will be directly connected to an operating brake cylinder and the other is connected through a flexible connection to operate in unison therewith.

Referring particularly to Figures 3, 4 and 5, the car section B is provided with brake beams 12' and 13 coupled to the operating lever 14, which is in turn operatively connected with the main lever 15 connected to the brake cylinder 16 and brake wheel 17. The lever 15 has connected therewith a rod 18 which extends toward the inward end of the car section B and this rod has linked to the end thereof a chain or cable section 19 which passes around a pulley 20 mounted in an angle bracket 21 secured to the end of the car section B in a position offset to one side of the longitudinal centre.

The car section A is provided with brake beams 22 and 23 operatively connected to an operating lever 24 which has connected thereto a rod 25 extending lengthwise of the car and which is coupled at the inward end to the chain 19 which passes around a pulley 26 mounted on an angle bracket 27 arranged on the inward end of the car section A in a position offset from the centre line a distance substantially equal to the offset of the pulley 20 and bracket 21, the chain extending in a horizontally and transverse direction between the two pulleys.

The pulleys 20 and 26 are journalled on pins 20' and 26' which are secured in a pair of bars 28 which form a compression member between the pulleys. The pulleys are mounted between the jaw ends 29 of the members 30 hinged to the brackets 21 and 27 to swing in a vertical plane. The jaw ends 29 are formed with longitudinal slots 31 to permit the pins 20' and 26' to slide therein.

It will be readily understood that the difference in centres between the brackets 21 and 27, constantly occuring while the car is in motion, require provision to maintain the pulleys 20 and 26 a fixed distance apart and this is accomplished by the universal support created by the hinged portions of the brackets being free to swing in a vertical plane, while the compression member formed by the bars 28 is free to swing in a horizontal plane and the pins, upon which the pulleys are journalled, slide in the slots 31.

With such an arrangement as shown the braking equipment of the two sections of the car are flexibly and universally connected so that the brakes will operate effectively and uniformly irrespective of difference of lading of the sections and curvature of track, either horizontally or vertically. The consequence is that for one car unit comprising two sections A and B there will be required only one brake cylinder with one air reservoir valve and hand brake assembly.

A car such as described is extremely light and flexible, but will carry the maximum load upon a uniform support and will therefore be extremely efficient particularly in the transport of removable goods containers. Such a car will therefore be operable under all conditions of service with difference of relative elevation above the rails, the pitch of the rail due to grades, or the position of the car section on curves either right or left.

Each of these car sections is preferably provided with a shock-absorbing mechanism individually mounted on each section and of the type fully described in U. S. Patent 2,072,988, March 9, 1937. Suffice it to say that through rods 33 and suitable spring buffing means the jack members 34 located at opposite ends which engage and hold the containers are connected so that impact shocks imparted to the car equipment will be greatly dissipated before they are transmitted to the containers and their contents, thus effecting a very material saving in the cost of operation.

What I claim as my invention is:—

1. An articulated container car comprising a pair of car sections each individually mounted upon wheel supports, a permanent flexible coupling joining said car sections, brake members on each of said car sections, a flexible member extending between said car sections and operatively connecting the brake mechanisms thereof, pulley guides for said flexible brake connection mounted respectively on the adjacent ends of said car sections, said pulley guides being disposed respectively on opposite sides of the longitudinal vertical centre plane of the car sections, means for rigidly spacing said guide means in a lateral direction but capable of flexible operation, and means mounted on one of said car sections co-operating with said flexible member for operating the brake mechanisms of the respective cars simultaneously, said flexible member having spaced portions supported on opposite sides of the said centre plane by the guide pulleys of the respective car sections with the intervening portion between the guide pulleys disposed in a plane transversely of the said centre plane.

2. An articulated container car comprising a pair of car sections mounted on individual wheel supports, draft means permanently and flexibly connecting said sections, brackets mounted on the adjacent ends of said car sections and disposed respectively on opposite sides of the longitudinal vertical centre plane of said car sections, jaw ends hinged to said brackets, pulleys mounted in said jaw ends to rotate in a substantially horizontal direction, means extending between the jaw end members of the respective car sections across the said centre plane thereof for spacing said pulleys apart, brake mechanisms on each of said car sections, a flexible connection between said brake mechanisms carried around said pulleys with the portion between said pulleys transversely crossing the said centre plane of the car sections and maintaining a flexible operating connection between said brake mechanisms and means mounted on one of said car sections co-operating with said flexible connection for operating both brake mechanisms.

3. In an articulated container car having car sections each individually mounted upon wheel supports and flexibly coupled, brake members on each of said car sections, and brake-operating means on one of said car sections, the combination therewith of operating connections extending from the brake members of said respective car sections longitudinally directly to points spaced transversely between the connected ends of said car sections and adapted to be tensioned longitudinally to apply the brakes, a single transverse flexible operative connection between said respective operating connections extending directly between said transversely spaced points in a plane normally disposed in substantially right angular relation to the central longitudinal vertical plane of the car sections, and means extending rigidly between said points having a pivotal and transverse floating connection with at least one of the car sections to minimize transverse thrust on the car sections on the application of the brakes.

4. An articulated container car comprising in combination car sections each individually mounted on wheel supports and flexibly coupled, brake members carried by each section of said car, brake-operating means on one of said car sections, the connected ends of said car sections having spaced guide pulleys mounted thereon with the guide pulley of one section disposed on one side of the longitudinal vertical centre plane of said car sections and the guide pulley of the other car section disposed on the opposite side of the said plane, means slidably supporting the pulleys of the respective car sections for uniform displacement in a plane disposed transversely of said central vertical plane to compensate for relative transverse shifting of said flexibly coupled car sections, and means flexibly connecting the brake members of said respective car sections having a portion guided by said slidably displaceable guide pulleys in a plane normally substantially right angularly disposed to the said central vertical plane whereby the braking thrusts will be transmitted efficiently between the coupled car sections with the minimum of fore and aft thrust on the said flexible coupling.

5. An articulated container car as claimed in claim 1 in which the means for rigidly spacing the pulley guides of the respective car sections comprises bar members having thrust bearing contact with bearing pins of the pulleys, which bearing pins are mounted for sliding displacement on the car sections.

6. An articulated car as claimed in claim 4 in which the means slidably supporting the pulleys is displaceable in unison with the pulleys of the respective car sections in said transversely disposed plane in a direction transversely of said central vertical plane and said guided portion of the flexible member is normally supported by said pulleys in a position to substantially horizontally intersect said central vertical plane.

7. In an articulated car having brake mechanisms on the respective sections and brake operating means carried by one of said sections, a flexible operative connection between the respective brake mechanisms, means for guiding said operative connection in part in a plane disposed transversely of the longitudinal vertical centre plane of the car between said car sections, said latter means including guide members pivotally connected with the respective car sections and each displaceable in a plane disposed transversely of the said longitudinal vertical centre plane, and means for maintaining the pivotal axes of said guide members uniformly spaced.

8. Means as claimed in claim 7 in which said guide members are displaceable in a plane intersecting the plane of disposition of the said guided part of the operative connection.

9. Means as claimed in claim 7 in which said means for maintaining the pivotal axes of said guide members spaced comprises a rigid spacing means connecting and positively spacing said axes apart transversely of the car and forming with said guide members a floating guiding structure flexibly interposed between the car sections.

WILLIAM PLATTS KELLETT, Jr.